United States Patent [19]
Chester

[11] 4,179,610
[45] Dec. 18, 1979

[54] APPARATUS TO INDICATE BIO-RHYTHM CURVES

[76] Inventor: James T. Chester, 13352 Maham Rd., Dallas, Tex. 75240

[21] Appl. No.: 859,743

[22] Filed: Dec. 12, 1977

[51] Int. Cl.² .............................................. G06C 3/00
[52] U.S. Cl. ................................ 235/89 R; 235/70 A; 235/85 R; 116/308; 116/309; 116/323; 40/107
[58] Field of Search .................. 235/89 R, 88 RC, 85, 235/84, 78 RC, 70 R, 70 A, 70 C; 116/308, 321, 323, 309; 40/107

[56] References Cited

U.S. PATENT DOCUMENTS

| | | | |
|---|---|---|---|
| 4,035,616 | 7/1977 | Piringer | 235/78 RC |
| 4,131,790 | 12/1978 | Rebsch | 235/89 R |

Primary Examiner—L. T. Hix
Assistant Examiner—Benjamin R. Fuller
Attorney, Agent, or Firm—Gerald G. Crutsinger

[57] ABSTRACT

Apparatus for simultaneously indicating the bio-rhythm curves which illustrate the emotional, mental, and physical cycles of a person comprising three slide elements, two of which are overlayed on the third and are transparent to simultaneously display all three curves in relationship to each other. The slides are mounted on a board having a transparent window with reference marks formed across in relation to a calendar scale indicating the days of the month and year. A reference scale is positioned near the start of the year for indicating the set point of the sliding scales and starting indicators are provided for calculating the starting day of each person's cycle in reference to his birthdate. A preferred embodiment has two scales such that the bio-rhythmic cycles of two persons may be compared to determine when they are compatible and incompatible.

8 Claims, 8 Drawing Figures

APPARATUS TO INDICATE BIO-RHYTHM CURVES

BACKGROUND OF THE INVENTION

The present invention relates to devices for indicating and displaying bio-rhythm cycles simultaneously to determine critical days in a person's physical, emotional and mental cycles. Heretofore, devices have used graph paper to hand draw curves for short periods of time after calculating starting points on complicated graphs. The devices require that the curves be drawn for each person and is a time consuming and slow process. In addition, the curves are often inaccurate.

Some devices have utilized electronic calculators for displaying curves, however, these devices have a limited time such as one month and do not readily display an entire year for forming an overall picture of one's bio-rhythm curves. Heretofore, none of the devices have simultaneously displayed two sets of curves so that person's having a close relationship such as husband and wife or people working together may simultaneously displace their particular bio-rhythm curves for that year to determine on what days they would be incompatible and most compatible.

The science of bio-rhythms deals with a theory that our bodies produce, store up and release energy on regular cycles. These cycles begin at birth and keep perfect time, never gaining or losing a second throughout our life time. There are three bio-rhythmic cycles, and each has its own rhythmic clock: the physical cycle which is 23 days long, the emotional cycle which is 28 days long, and the mental cycle which is 33 days long. The pattern of highs and lows of these cycles has a powerful effect on our moods, physical state and mental ability. On high days you will be most creative and mentally sharp and on low days you will be less demanding of yourself. These cycles are represented by sine waves having a wave length equal to the length of the cycle. The horizontal axis represents the critical line. As the sine wave crosses the critical line this is a caution day in which you are more apt to have physical, emotional, or mental failures.

Since the cycle runs from the moment of birth one can compute his cycle for each year of his life and recognize caution days of the month or year and prepare for them to prevent problems from occuring on these days.

SUMMARY

The device comprises a board having three transparent slide elements slideably disposed in a passage within the board adjacent the calendar scale which indicates the days of the month and year. The calendar scale is calibrated to indicate months and days of the month of a leap year and a regular year with reference lines across a transparent cover over the sliding scales. A reference scale is disposed at the start of the year and indicates the first 33 days which is equivalent to the longest cycle, the mental cycle. The reference scale will indicate the start of the cycle for that year such that the reference line of a starting cycle can be set at the beginning of that first cycle. Each cycle will have its own reference point or starting point for that year where the sine wave is increased and crosses the critical line. The critical line is drawn through so that one will be able to find the critical days.

The second scale and slide elements are disposed on the bottom. This allows a second person's bio-rhythmic curves to be plotted for comparison with the first person's. This allows husbands and wives, business partners and soforth to recognize periods where they will both have critical days at the same time.

Each of the slide elements has a sine wave printed thereon equal to one of the cycles and preferably printed in a different color so that they are readily recognizable. Since the slides are transparent the sine waves will overlap and sometimes cross the line and simultaneously indicating a double critical day.

The reference indicator is formed by three discs for each of the cycles mental, emotional, and physical for indicating a starting point of each cycle in reference to the birthday of the individual.

A primary object of the invention is to provide an adjustable indicator which displays simultaneously the three bio-rhythmic cycles for a year and provides dual scales for comparing two person's bio-rhythmic cycles.

A further object of the invention is to provide slide elements which are transparent and overlay each other to display information to the user.

A still further object of the invention is to provide a sliding device which is readily adjustable to each year to a starting point indicated by a predetermined calculation for the year of interest and which is economically feasible for the average user.

Other and further objects of the invention will become apparent upon studying the detailed description hereinafter following the drawings annexed hereto.

BRIEF DESCRIPTION OF THE DRAWINGS

A brief description of a preferred embodiment of the invention is attached hereto in which.

Numeral references are used to designate throughout the various figures of the drawings.

DESCRIPTION OF A PREFERRED EMBODIMENT

Figure 1:
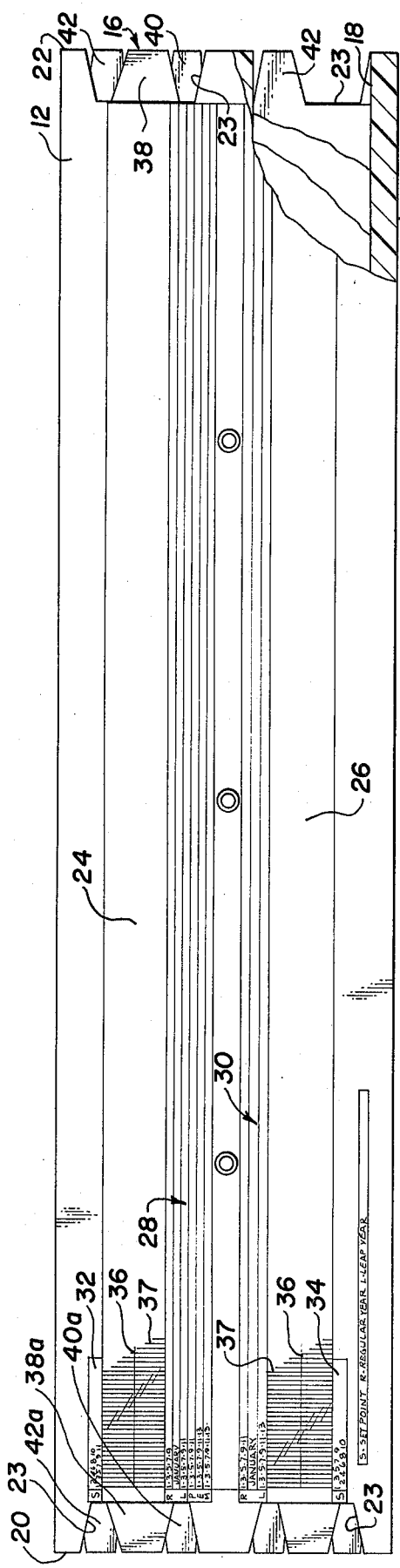
FIG. 1 is a front elevational view of the bio-rhythm indicator with parts broken away to more clearly illustrate the details of construction.
Figure 2:
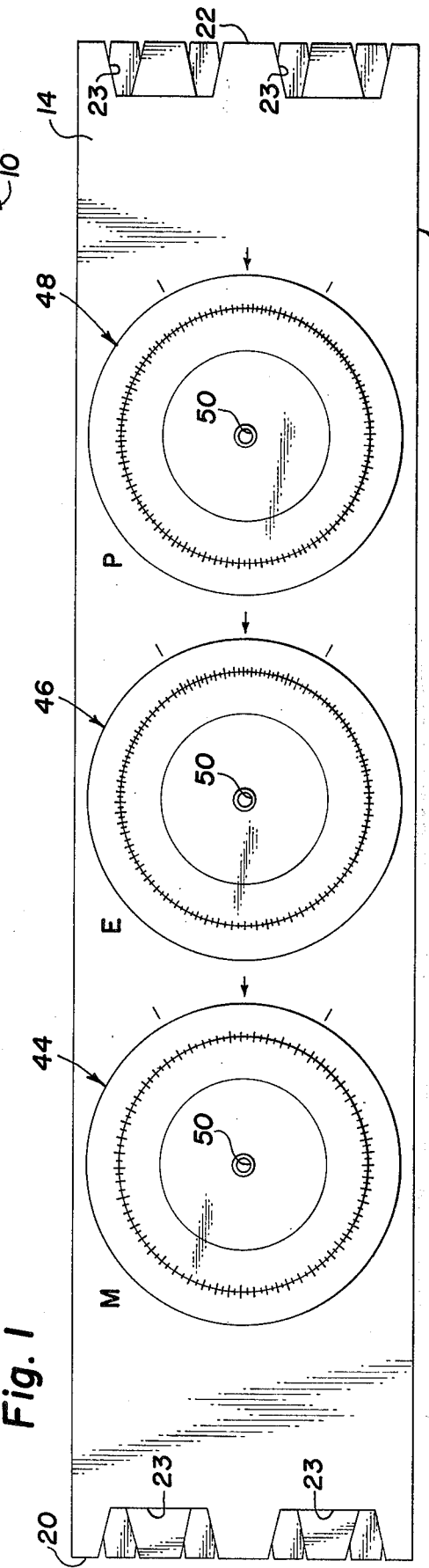
FIG. 2 is a rear elevational view thereof.
Figure 3:
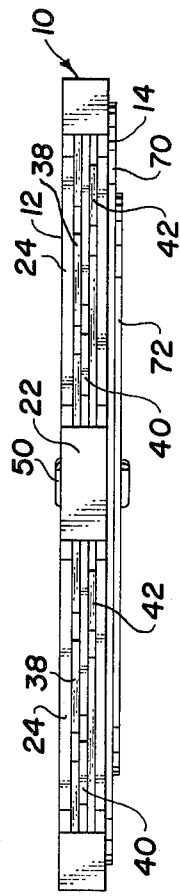
FIG. 3 is an enlarged end view thereof.

Referring to FIGS. 1-3 of the drawings, the device generally comprises a board or body 10 having a front surface 12 and a rear surface 14. The body has two passages 16 and 18 formed longitudinally through the body 10 from end 20 to end 22 of body 10. Ends 20 and 22 have recessed notches 23 formed at the end of passages 16 and 18.

Front surface 12 has two transparent covers 24 and 26 centered over each passage 16 and 18 formed in body 10.

Each cover 24 and 26 has a calendar scale generally designated 28 and 30 formed along the side of the covers 24 and 26.

The reference scale 32 and 34 are formed adjacent end 20 of body 10 adjacent the covers 24 and 26. A caution line 36 is formed down the center of each cover 24 and 26 bisecting the covers to form a zero axis. Reference marks 37 are etched on the transparent covers 24 and 26 adjacent each day of the year on the calendar scales 28 and 30.

The bio-rhythm curves are displayed slide elements 38, 40 and 42 slideably disposed in the passage 16, and 18 of the body 10. Slide elements 38, 40 and 42 are slideably independently relative to each other. Recesses 23 allows access to slides 38, 40 and 42. Thumb tubs 38a, 40a, and 42a, are formed on each end of slides 38, 40 and 42 for setting the slide.

Means to indicate starting points comprises starting indicator discs 44, 46, and 48 which may be secured to the rear surface 14 of body 10 by rivets 50 to be more fully explained hereinafter.

Figure 4:
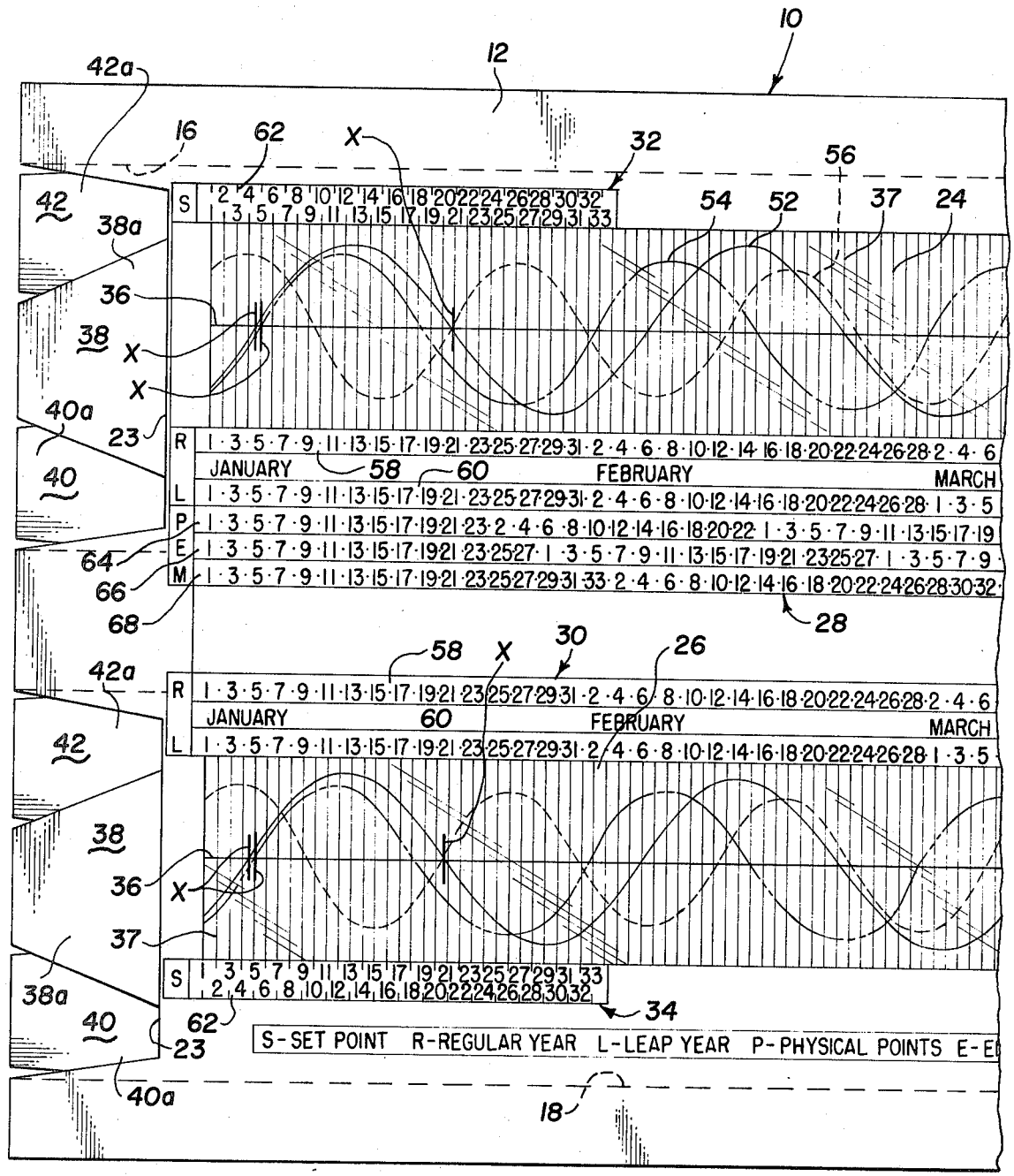
FIG. 4 is a fragmentary elevational view of the left end of the device illustrated in FIG. 1.
Figure 5:
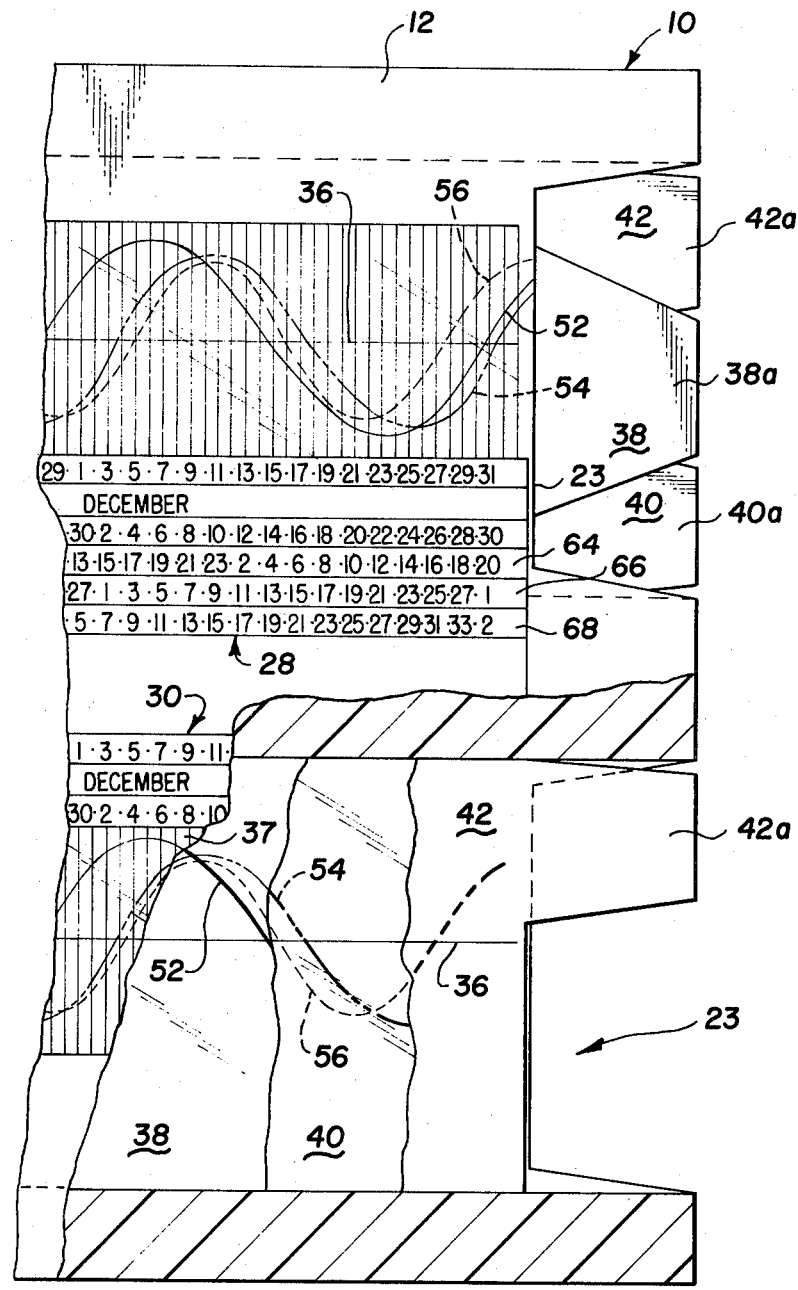
FIG. 5 is a fragmentary elevational view of the right end of the device illustrated in FIG. 1.

Referring to FIGS. 4 and 5 of the drawing, slide elements 38, 40 and 42 each have sinusoidal curve representing one of the bio-rhythmic cycles. Slide element 38 is a constructed of a transparent material and has a sine wave 52 shown in full outline printed thereon having a wave length of 33 days for plotting the metal cycle. Slide element 40 is also transparent and has a sine wave 54, 54 shown in long and short dashes, printed thereon having a wave length of 28 days for plotting the emotional cycle. Slide element 42 has sine wave 56 shown in dashed outline printed thereon which has a wave length of 23 days for plotting the physical cycle. Slide elements 38 and 40 are transparent such that all of the sine waves 52, 54 and 56 are visible through transparent covers 24 and 26.

The calendar scale 28 comprises a regular year calendar scale 58 having numerals thereon for each day of each month and is shown in FIG. 4 the first part January 1st through March 6th and the second part in FIG. 5 showing November 29th through December 31st. A leap year is shown on scale 60 just below the regular year scale 58. Calendar scale 30 comprises a regular year 58 and leap year 60 also.

Reference scales 32 and 34 comprise reference marks 62 for the numerals 1–33 corresponding to the first 33 days of the year January 1 through February 2. This povides a set point for setting a starting point of each curve 52, 54 and 56 as will be more fully explained hereinafter. Indicia is printed on the reference scales 32 and 34 to indicate the set points for each day. Reference marks 37 correspond to each day of the year, there being 366 reference marks. Indicia is printed on the calendar of regular year scale 58 and leap year scale 60 to indicate every other day of the year. Dots are indicated between the indicia to indicate those days omitted.

Calendar scale 28 also has three scales labeled P, E, and M which are indicator scales 64, 66, and 68 respectively. Indicator scale 64 is for the physical cycle and has numerals 1 through 23 sequentially and repeats throughout the year as can be seen in FIGS. 4 and 5. Because the year is not evenly divisible by 23, the physical scale 64 ends with numeral 20. The emotional cycle indicator scale 66 repeats for the length of the cycle, which is 28 days, and follows sequentially throughout the year and ends with the numeral 1 on December 31. The mental cycle indicator scale 68 comprises the numerals 1 through 33 in sequential order and repeats throughout the year and ends with the numeral 2. As will be more fully explained hereinafter, the indicator scales 64, 66 and 68 provide a means to calculate the set point on scales 32 and 34.

Figure 8:
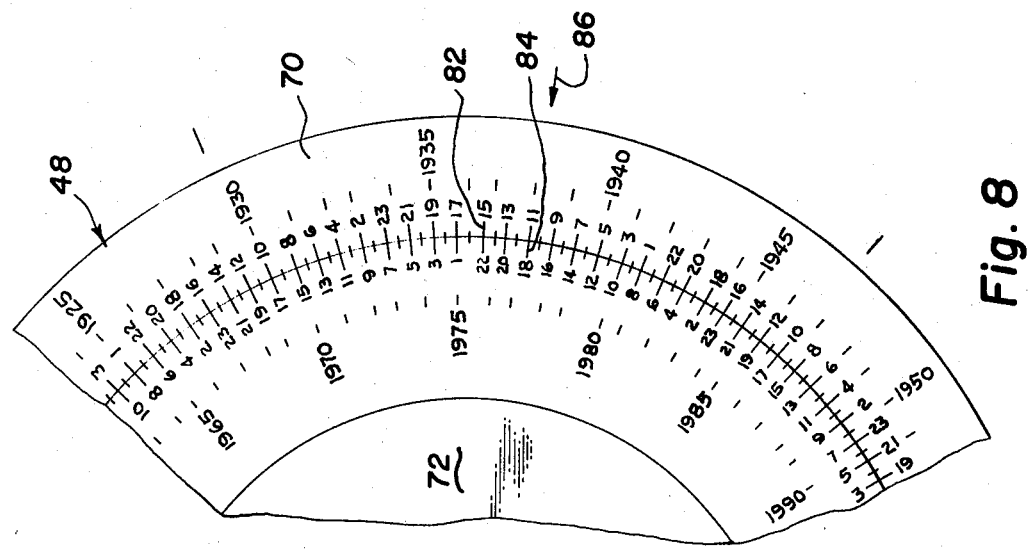
FIG. 8 is an enlarged fragmentary view of the physical cycle indicator illustrated in FIG. 2.
Figure 7:
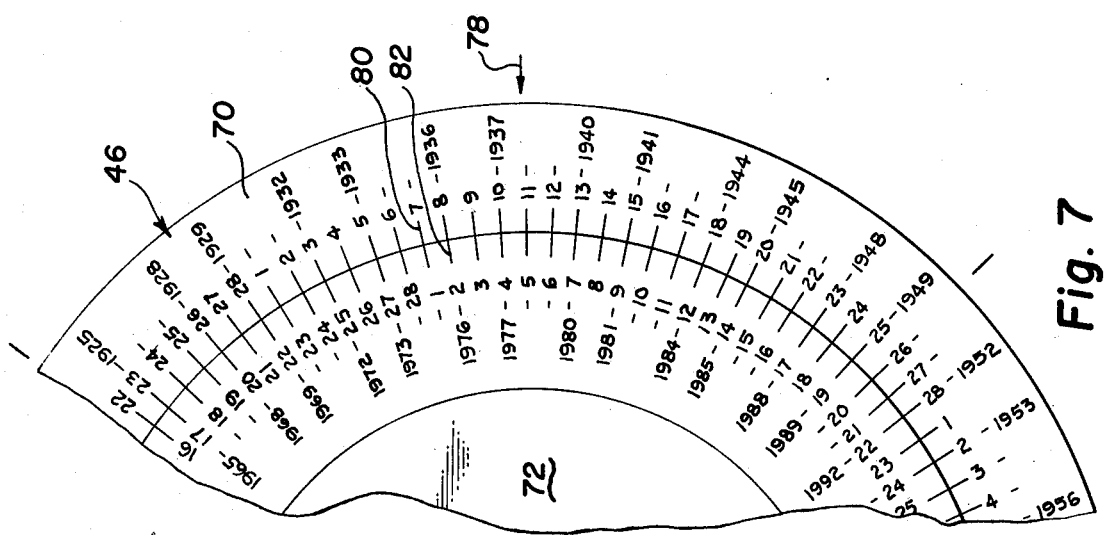
FIG. 7 is an enlarged fragmentary view of the emotional cycle indicator illustrated in FIG. 2.

The starting indicator discs 44, 46 and 48 generally comprise a first circular disc 70 and a second circular disc 72 rotatably disposed on brads 50. Each of the discs 70 and 72 have indicia printed thereon as best illustrated in FIGS. 6, 7 and 8.

Figure 6:
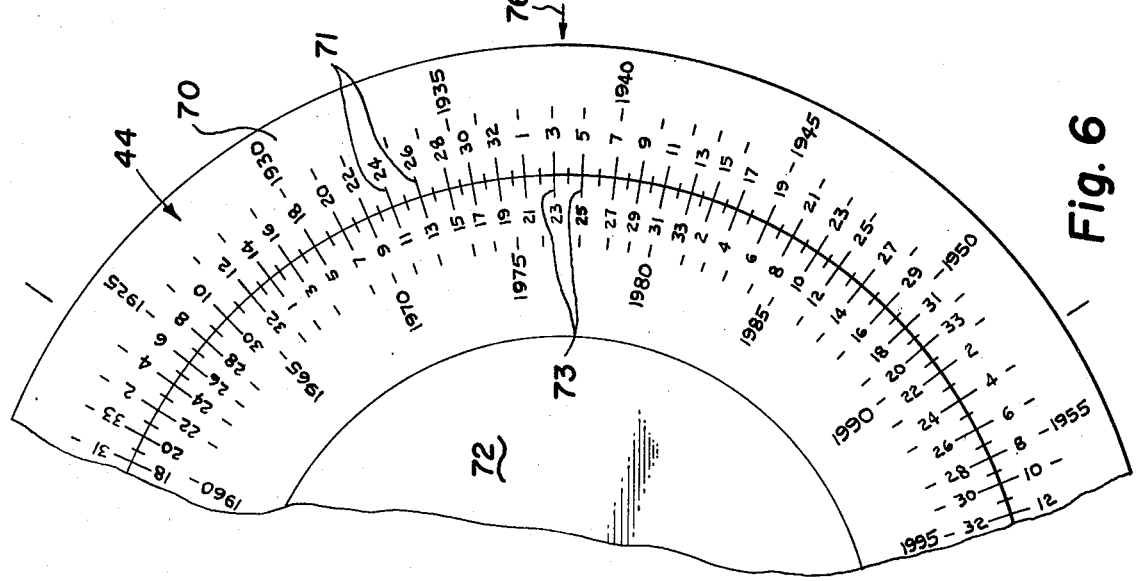
FIG. 6 is a fragmentary elevational view of the mental cycle indicator illustrated in FIG. 2.

As best illustrated in FIG. 6 the mental starting indicator disc 44 comprises an outer disc 70 and inner disc 72. The outer disc 70 has years sequentially indicated around the disc on every fifth reference mark from the year 1908 to the year 2000. Each of the reference marks 71 on the outer disc 70 represents the numbers 1 to 33, the length of the mental cycle, and are alternately numbered by indicia. The inner scale on disc 72 has like reference marks 73 which are numbered 1–33 and labeled alternately. A second year scale is provided on the inner disc 72 having year indication on every fifth mark indicates the years 1908 to 2000. The reference mark 76 indicates the starting point. In order to find the set point for the mental scale, set the outer scale on disc 70 such that the year of birth is aligned with reference mark 76. Align the inner scale calendar with the reference mark 76 to the year of desired information. Referring to the calendar scale 28 and find your birthday on the regular scale if you were born on a regular year, and on a leap year scale if you were born on a leap year and look directly below your birth date. Note the number which appears in the mental indicator scale 68. On the outer disc 70, move in a counterclockwise direction until you find the number which appeared below your birthday on the scale 68 on the outer scale on disc 70. Then read the number corresponding to the reference mark scale appearing on the inner scale on disc 72 and this gives the set point number for the mental cycle on slide element 38. Set slide element 38 such that the cross hair X is aligned with the set point number.

Starting indicator 46 for the emotional cycle has an outer disc 70 and inner disc 72. The years on the outer disc 70 are marked in sets of four for example, 1933, 1934, 1935 and 1936, then a reference mark, in this case indicated as 9, is skipped and the next year 1937 is started and another four years are included. Reference marks 80 are numbered through 28 the same length as the emotional cycle. The inner disc 72 has reference marks 82 corresponding with reference marks 80 numbered 1 through 28 sequentially and repeated around the disc. The years are marked off in sets of four skipping a reference mark just as on the outer disc. A reference mark 78 gives the starting point. One moves the outer disc 70 to the year of birth, the inner disc 72 to reference mark 78 for the year of desired information. Find the numeral below the birth date of the calendar scale 28 on indicator scale 66 and moves counterclockwise to find that number. The number opposite the outer reference scale reference 80 is the set point number on reference scale 32. Move the cross hair X on slide element 40 to that set point number on scale 32.

The last starting indicator disc 48 is for the physical cycle. The years are marked off from 1908 to 2000 on the outer disc 70. The reference marks 82 are printed on the outer disc 70 and are numbered sequentially 1 through 23 every other number being printed on a scale. The inner scale has reference marks 84 which correspond with the reference marks 82 and a second calendar with years 1980 to 2000 is printed on the inner scale. In the same manner the reference point 86 provides the year to line up the date of birth and the year of desired reference. The number below the birth date on the P scale 64 is read and moving counterclockwise from the reference scale 86, the number opposite that number gives the set point on the reference scale 32. Then set cross hair X of element 42 to that number.

The starting cross-hair X as illustrated in FIG. 4 indicates the starting point of each cycle 52, 54, and 56 and provides a reference point for setting on the set point 62 of reference scale 32. In a like manner cross-hairs X are provided on the bottom slides for setting the second set of slide elements 38, 40 and 42 in reference to reference scale 34 where a second set occurs.

If desired, a large sliding cross-hair may be provided on the body not shown in the drawings and slide the length of body to compare critical days of the curves 52, 54 and 56 as they cross the caution line 36 in each set of slide elements under slide covers 24 and 26. This would provide an accurate measurement or reference point for comparing the two persons bio-rhythmic curves.

The bottom slide elements 38, 40, and 42 are set in a like manner using calendar 30 and reference scale 34.

It should be readily apparent that the embodiment hereinbefore disclosed accomplishes the objects of the invention.

It should further be appreciated that other and further embodiments of the invention may be devised without departing from the basis concept herein.

Having described my invention, I claim:

1. Apparatus for indicating bio-rhythm curves comprising: a body; a calendar scale having numerals to indicate the days of the year positioned on the body; a reference scale positioned at the beginning of the calendar scale, said reference scale being numbered to indicate the number of days within the longest cycle; a first slide element mounted with said body and having a first sine wave printed thereon representing a first bio-rhythm cycle; a second slide element mounted with said body and having a second sine wave printed thereon to represent a second bio-rhythm cycle; a third slide element mounted with said body having a third sine wave printed thereon representing a third bio-rhythm cycle, the first, second and third slide elements cooperating with said body to provide three bio-rhythm curves for a first individual over the calendar year; a fourth slide element mounted with said body and having a sine wave printed thereon representing one of the three bio-rhythmic cycles; a fifth slide element mounted with said body and having a sine wave printed thereon representing another of the three bio-rhythmic cycles; and a sixth slide element mounted with said body and having a sine wave printed thereon representing the third of the three bio-rhythmic curves, the fourth, fifth and sixth slide elements cooperating with said body to provide three additional bio-rhythmic curves for a second individual over the calendar year to thereby permit the first and second individuals to compare their bio-rhythm curves over such calendar year.

2. The combination called for in claim 1 wherein the calendar scale has indicia printed thereon to indicate a regular year in months and days and to indicate a leap year in months and days.

3. The combination called for in claim 1 wherein the reference scale has indicia printed thereon indicating each of the 33 days of the mental cycle and reference marks for each of those days corresponding to the first 33 days of the year.

4. The combination called for in claim 1, including first and second passages formed longitudinally through said body, first and second transparent shields positioned over the first and second passages respectively, each shield having reference lines corresponding to each day of the year on the calendar scale; the first, second and third slide elements being slideably disposed in the first passage for simultaneously displaying all three sine waves and the fourth, fifth and sixth slide elements being slideably disposed through the second passage for simultaneously displaying the three sine waves for the second individual.

5. The combination called for in claim 4, wherein the calendar scale has indicia printed thereon to indicate a regular year in months and days and to indicate a leap year in months and days.

6. The combination called for in claim 4, wherein the reference scale has indicia printed thereon indicating each of the 33 days of the mental cycle and reference marks for each of those days corresponding to the first 33 days of the year.

7. The combination called for in claim 4 wherein the body has a recess formed at each end of the passage formed longitudinally through the body and each of the slide elements has a finger tab formed thereon extending out into the recess for access to each of the slide elements.

8. The combination called for in claim 4 with the addition of: starting indicator discs for the emotional cycle, physical cycle and mental cycle; a starting indicator scale for the physical cycle having indicia for the length of the physical cycle printed adjacent the calendar scales and repeated throughout the year; a starting indicator scale for the emotional cycle having indicia for the length of the emotional cycle printed adjacent the calendar scale and repeated throughout the year; and a starting indicator scale for the mental cycle the days having indicia for the length of the mental cycle printed adjacent the calendar scale and repeated throughout the year.

* * * * *